Feb. 6, 1973  D. L. TODD ET AL  3,715,062
METHOD AND APPARATUS FOR DISPENSING MATERIAL
Original Filed Feb. 14, 1969

INVENTORS
DONALD L. TODD
CECIL W. SCOGGINS

BY

ATTORNEYS

United States Patent Office 3,715,062
Patented Feb. 6, 1973

3,715,062
METHOD AND APPARATUS FOR DISPENSING MATERIAL
Donald L. Todd, 560 10th St. NW., and Cecil W. Scoggins, 1189 Holley St. NW., both of Atlanta, Ga. 30318
Continuation of abandoned application Ser. No. 799,157, Feb. 14, 1969. This application Aug. 16, 1971, Ser. No. 172,284
Int. Cl. G01f 11/36
U.S. Cl. 222—340
5 Claims

ABSTRACT OF THE DISCLOSURE

A method and aparatus for dispensing a slurry of material. The method includes the steps of accumulating a predetermined quantity of the slurry from a pressure source subsequently discharging the accumulated quantity of the slurry. The apparatus comprises a valve and accumulator assembly for receiving material such as a crushed ice slurry under pressure. In one position of the valve, the accumulator accepts a predetermined quantity of the material and when the valve is returned to its normal position, the accumulator expels the predetermined quantity of material through a dispensing nozzle.

This application is a continuation of application Ser. No. 799,157, filed Feb. 14, 1969, now abandoned.

BACKGROUND OF THE INVENTION

There are many circumstances under which it is desirable to dispense a metered quantity of a slush or slurry material and various mechanisms have been developed to achieve this objective. These mechanisms have generally been unable to dispense a predetermined quantity of this material without resorting to complex and expensive mechanisms and while still retaining the capability of easily and accurately controlling the quantity of material dispensed.

BRIEF SUMMARY OF THE INVENTION

The present invention overcomes the problems associated with the prior art by providing a method and apparatus which accumulates a predetermined quantity of the slurry or slush of the material from a pressurized source and then discharges the accumulated material. The apparatus includes a valve and pressure accumulator assembly wherein actuation of the valve connects the accumulator to a supply source of material under pressure so that the accumulator accepts an adjustable predetermined quantity of material, and wherein return of the valve to its normal position connects the accumulator to a dispensing nozzle so that the quantity of material is expelled therethrough.

This arrangement allows the use of a simple and inexpensive valve block upon which the accumulator is mounted and within which the valve operates. The valve is a simple piston and plunger arrangement operating between a normal position in which it is located beyond a pair of staggered openings, the nearest of which leads to the accumulator and the farthest of which leads to the dispensing nozzle, and an actuated position in which it resides between the two openings. The valve block is provided with a boss forming a locating seat for the lower end of the accumulator cylinder which houses a piston and compression spring. An adjustable stop serves to control the quantity of material accepted by the accumulator.

BRIEF DESCRIPTION OF THE DRAWING FIGURES

DETAILED DESCRIPTION OF THE INVENTION

Figure 1:
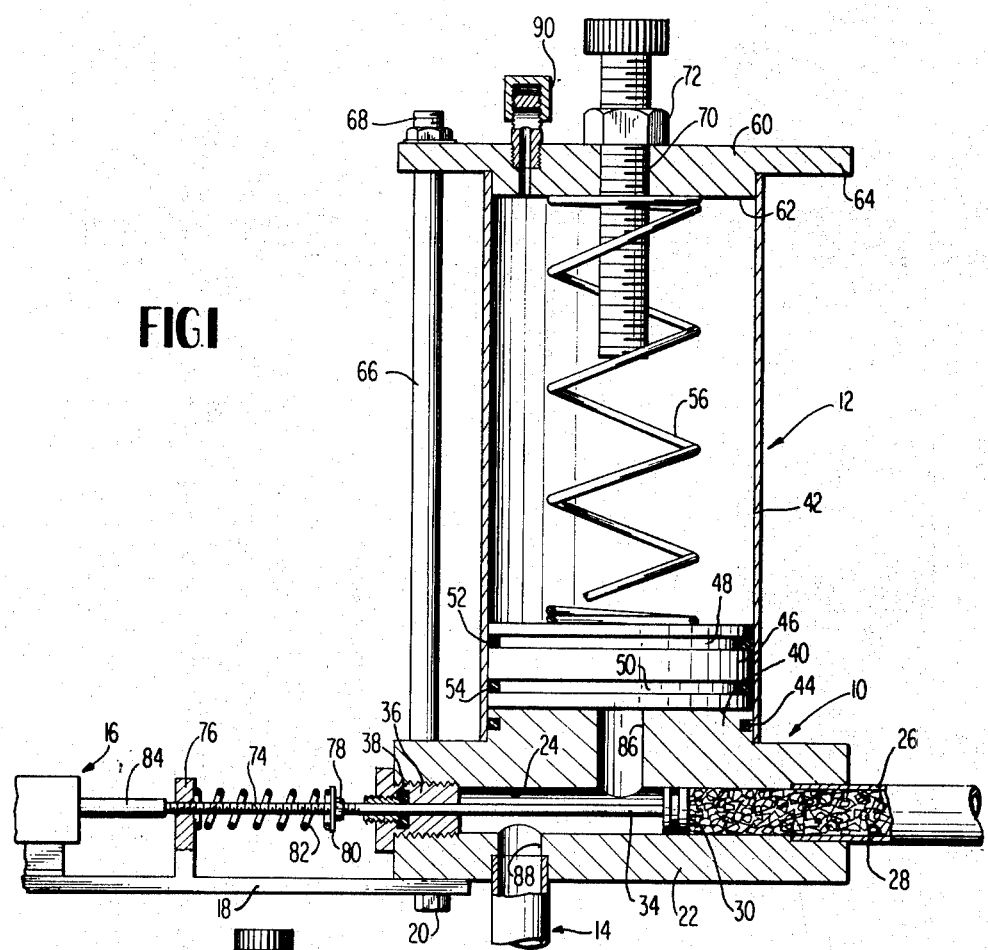
FIG. 1 is an enlarged vertical section taken through an accumulator and valve assembly according to the present invention.

The embodiment of the invention shown in FIG. 1 incorporates a valve block indicated generally by the reference character 10 and which provides a mounting character 12, there being provided a discharge nozzle device 14 leading from the valve block and there also being a valve actuating mechanism 16 conveniently mounted as by a support or bracket 18 removably attached by fasteners 20 to the valve block.

The main body 22 of the valve block is provided with a straight bore 24 extending completely therethrough, one end of which is connected to a conduit 26 constituting a source of material 28 under pressure leading directly to the chamber afforded by the bore 24. A valve in the form of a piston 30 is slidably received within the bore 24 and is provided with an actuating rod or plunger 34 which extends therefrom, through a hollow plug element 36 and an associated seal 38 and extends to the valve actuator mechanism 16.

Rising from the main body portion 22 of the valve block is a circular boss portion 40 which forms a seat for the lower end of a cylinder 42 forming part of the accumulator assembly 12. The boss 40 may be peripherally grooved and provided with an O ring 44 to seal against the inner surface of the cylinder or sleeve 42. A piston 46 provided with circumferential grooves 48 and 50 receiving the O rings 52 and 54 is disposed within the cylinder 42 in freely floating relation therewithin and a compression spring 56 seats against this piston normally to urge it to the lowermost position as is shown in FIG. 1. A cover plate 60 is engaged on the upper end of the cylinder 42, being provided with a boss 62 to locate the cylinder properly and the cover plate presents a marginal flange 64 through which a plurality of studs project as for example the studs 66 shown in FIG. 1 serving to clamp the cover plate 60 against the upper end of the cylinder 42. The studs 66 are anchored in the valve block and are provided with nuts 68 at their upper ends substantially as is shown.

The compression spring 56 operates between the under side of the cover plate 60 and the opposing surface of the piston 46 and an adjustable stop member 70 is threadedly engaged centrally of the boss portion 62 of the cover plate 60 and may be provided with a lock nut 72 serving to hold its adjustment, the purpose of the adjustable stop being to limit the upper displacement of the piston 46 under action of the pressurized material 28 as will be described hereinafter.

Figure 2:
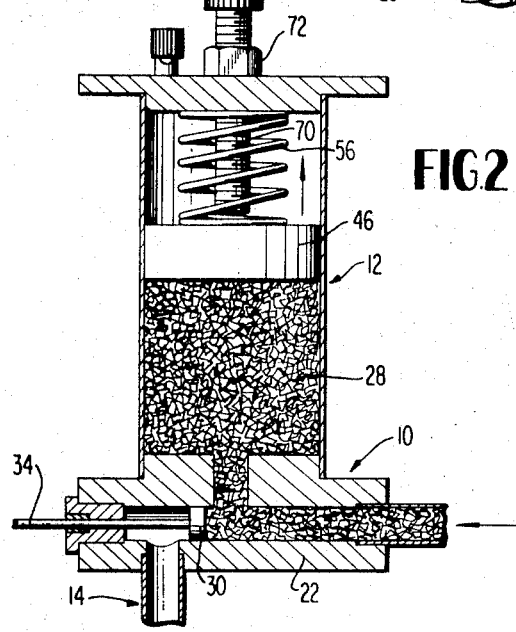
FIG. 2 is a somewhat diagrammatic view of the assembly shown in FIG. 1, on reduced scale, showing the position of the valve at the initiation of a cycle; and, FIG. 3 is a view similar to FIG. 2 but showing the position of the valve at the termination of its cycle.
Figure 3:
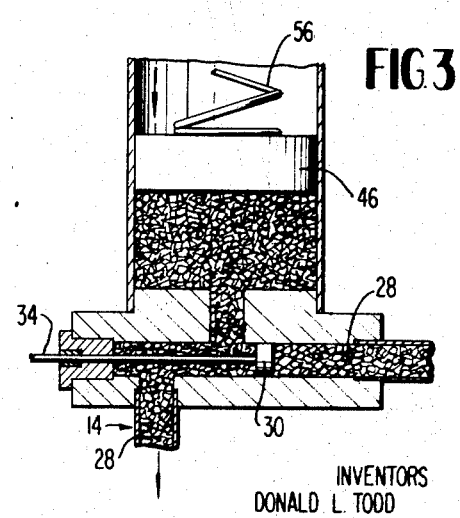

The actuating rod 34 for the valve 30 is provided with a threaded portion 74 which projects through an upstanding ear 76 on the bracket 18 and which carries an adjustable member in the form of the nut 78 which bears against a washer 80 serving to provide a seat for one end of the compression spring 82, the opposite end of which is seated against the ear 76, as shown. The valve actuator 16 may be in the form of a solenoid having a movable armature 84 attached to the threaded end portion 74 of the actuating rod 34, the nut 78 being provided to limit the axial displacement of the rod 34 under the action of the solenoid or similar actuator 16. When the valve is actuated from the normal position shown in FIG. 1, same is displaced to the position as shown in FIG. 2 so that the valve 30 is disposed between the two openings 86 and 88 leading into the bore or chamber 24 thereby to communicate the pressurized material 28 with the interior of the accumulator device 12 so as to force the piston 46 of the latter upwardly as is shown in FIG. 2 until it comes to rest against the adjustable stop element 70. Thereafter, when the valve 30 is returned to its normal position as is shown in FIG. 3, the stored energy in the compression spring 56 will force the piston 46 downwardly to expel the material 28 through the discharge nozzle 14 connected to the opening 88. As will be evident, the actuator 16 must operate sufficiently long with the valve 30 in the position shown in FIG. 2 to allow the predetermined quantity of material to be accepted by the accumulator 12, whereafter the valve 30 is returned to its normal position. It will also be evident that a suitable vent 90 may be provided above the piston 46 so as to control the escape of air from above the piston and allow its unfettered upward movement.

The dispensing mechanism is particularly well suited for dispensing crushed ice used in conjunction with the sale of flavored iced cones but it is to be understood that other and different types of material may conveniently be dispensed with the mechanism described hereinabove.

The method of the invention comprises the steps of selectively accumulating a predetermined quantity or volume of a slurry or slush of material from a pressurized supply source, and subsequently discharging the accumulated material through a dispensing nozzle into an appropriate container.

The present invention, therefore, is well adapted to carry out the objects and attain the ends and advantages mentioned as well as others inherent therein. While the presently illustrative embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An apparatus for dispensing slurry material comprising supply means for supplying such material under pressure, a valve block having a longitudinal passage connected at one end to said supply means and extending throughout the length of the block, second and third passages extending laterally from said first passage at longitudinally spaced points, a circular boss portion formed on said valve block, said third passage opening through said boss, an accumulator cylinder fitting slidably and sealingly at one end over said boss, whereby said cylinder is mounted on said valve block, a piston slidably mounted in said cylinder, an adjustable staff projecting inward from the other end of said cylinder and adapted to engage said piston for limiting its movement, a compression spring interposed between said piston and said other end of the cylinder for urging the piston toward the valve block, a valve stem movable axially of said longitudinal passage, a valve on said stem adapted to be moved from a first position intermediate said second and third passages to a second position intermediate said third passage and the end of the longitudinal passage to which said supply means is connected, a spring surrounding said valve stem and normally holding said valve in said second position, and means for moving said valve against the action of said spring into said first position.

2. An apparatus as in claim 1 in which a plurality of studs are anchored in the valve block and extend thence along the cylinder, and in which the end of the cylinder opposite the valve block is provided with a marginal flange having openings through which said studs project, the ends of the studs which project through said flange being threaded, and nuts being threaded on said studs and engaging said flange, to hold the cylinder in position on the valve block.

3. An apparatus as in claim 1 wherein a supporting bracket is removably attached to said valve block adjacent the end of the longitudinal passage opposite the supply means, said bracket extending away from the block in a direction parallel to said longitudinal passage and being formed with an upstanding ear through which said valve stem passes, said spring surrounding said valve stem bearing at one end against said ear, and said valve stem being provided with an adjustable nut against which the other end of said spring bears, whereby the force exerted to said spring may be adjusted.

4. An apparatus as in claim 3 wherein said means for moving the valve is a solenoid mounted on the end of the valve stem beyond said upstanding ear.

5. An apparatus as in claim 2 wherein said piston and said boss are provided with circumferential grooves in which O rings are inserted for sealing said piston and boss against the inner wall of said cylinder.

References Cited

UNITED STATES PATENTS

| 206,151 | 7/1878 | Tavener | 222—453 X |
|---|---|---|---|
| 1,601,467 | 9/1926 | Brownworth | 222—386 X |
| 1,918,049 | 7/1933 | Maske | 222—387 X |
| 1,733,310 | 10/1929 | Manley | 222—453 X |

ROBERT B. REEVES, Primary Examiner

J. M. SLATTERY, Assistant Examiner

U.S. Cl. X.R.

222—453